United States Patent
Rose, III et al.

(10) Patent No.: US 6,632,754 B1
(45) Date of Patent: *Oct. 14, 2003

(54) UNBALANCED TWILL WEAVE FABRIC AND AIRBAG DEVICE

(75) Inventors: Otis Bryce Rose, III, South Boston, VA (US); Ronald J. Small, Greensboro, NC (US); Wilford Allen Leonard, Jr., Greensboro, NC (US)

(73) Assignee: Precision Fabrics Group, Inc., Greensboro, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/784,806

(22) Filed: Jan. 16, 1997

(51) Int. Cl.[7] .......................... D03D 1/02; D03D 15/00
(52) U.S. Cl. ................ 442/208; 442/209; 442/213; 442/215; 442/216; 442/218; 442/220; 442/168; 442/189
(58) Field of Search ................ 442/208, 209, 442/189, 213, 215, 218, 220, 60, 168, FOR 134, FOR 135

(56) References Cited

U.S. PATENT DOCUMENTS

| | | | |
|---|---|---|---|
| 3,861,892 A | 1/1975 | Wisdom, Jr. et al. | 51/295 |
| 4,356,844 A | 11/1982 | Thompson | 139/383 |
| 4,384,021 A | 5/1983 | Aoyama | 428/193 |
| 4,437,496 A | 3/1984 | Thompson | 139/383 |
| 4,453,573 A | 6/1984 | Thompson | 139/383 |
| 4,636,427 A * | 1/1987 | Ohno et al. | 442/208 |
| 4,865,906 A | 9/1989 | Smith, Jr. | 428/224 |
| 5,073,418 A | 12/1991 | Thornton et al. | 428/349 |
| 5,187,004 A * | 2/1993 | Risseeuw | 442/199 |
| 5,202,086 A | 4/1993 | Baliga et al. | 428/225 |
| 5,244,718 A | 9/1993 | Taylor et al. | 428/229 |
| 5,277,230 A | 1/1994 | Sollars, Jr. | 139/389 |
| 5,382,200 A | 1/1995 | Kimoto | 474/260 |
| 5,394,563 A * | 3/1995 | Doyle | 442/208 |
| 5,424,117 A | 6/1995 | Heiman et al. | 428/229 |
| 5,928,971 A * | 7/1999 | Ellis et al. | 442/76 |

OTHER PUBLICATIONS

Textile Fabrics and Their Selection, 8th ed., Wingate and Mohler; Prentice–Hall, Inc., NJ; pp. 91–93, 1984.*
Introducory Textile Science, 5th ed., M.L. Joseph; Holt, Rinehart, and Winston, NY; pp. 185–186, 1986.*
J. J. Pizzuto, "101 Weaves in 101 Fabrics," pp. 14, 27, and 38, 1961.*
Wingate and Mohler, "Textile Fabrics and Their Selection," pp. 87–90 and 156–158, 1984*

* cited by examiner

Primary Examiner—Cheryl A. Juska
(74) Attorney, Agent, or Firm—Finnegan, Henderson, Farabow, Garrett & Dunner, L.L.P.

(57) ABSTRACT

The present invention relates to an unbalanced twill weave fabric having fill yarns at least about three times larger than the warp yarns. Such a fabric thus has increased strength provided by the fill direction. The present invention further relates to an airbag restraint device for vehicles, where the airbag is constructed of the unbalanced twill weave fabric and has the fill yarns oriented substantially parallel to the longest direction of the airbag.

10 Claims, 3 Drawing Sheets

UNBALANCED TWILL WEAVE FABRIC AND AIRBAG DEVICE

FIELD OF THE INVENTION

The present invention relates to an unbalanced twill weave fabric having variable strength between the warp and fill directions. More particularly, the present invention relates to an unbalanced twill weave fabric comprising fill yarns with a denier at least three times greater than the denier of the warp yarns. The present invention further relates to the use of such a fabric for occupant restraint devices and systems for increasing the safety of moving vehicles. In particular, one embodiment of the invention includes an inflatable airbag having a substantially tubular shape, wherein the airbag fabric is comprised of an unbalanced twill weave fabric.

BACKGROUND OF THE INVENTION

Because of increased interest in automobile safety and passive restraint systems for the protection of the driver or passengers, inflatable airbag assemblies have become well known in the art. These inflatable airbag assemblies typically have a gas supply means and an airbag to which the gas is delivered. In the event of a collision, an impact sensing system activates the gas supply means which in turn inflates the airbag, thus providing a protective cushion for the vehicle's occupants. The inflated airbag, acting as a cushion, prevents or reduces injuries to the vehicle's occupants caused by violent contact with the inner surfaces of the vehicle.

Conventional airbag systems currently marketed, however, have undergone recent criticism due to injuries and fatalities caused by the airbag system itself. These conventional systems, which typically store an airbag in the dashboard or steering wheel of an automobile, activate the airbag in the direction of the automobile's occupant. The force of the gases inflating the airbag has caused injuries to the occupants. Small children have been especially vulnerable to these types of injuries.

In response to these problems, it has been proposed to incorporate the inflatable airbag device into a seatbelt. Such an assembly, where the airbag is stored in at least the shoulder harness of the seatbelt, carries an advantage in that the airbag is stored in close proximity to the occupant. In the event of a collision, the airbag in the seatbelt activates from a position much closer to the occupant, thereby reducing both the forces generated by the airbag in the direction of the occupant and by the occupant's forward motion in the direction of the airbag. Reduction of these forces may reduce the occurrence of injuries caused by the airbag's impact against the vehicle's occupant.

The design of such an airbag as part of a seatbelt assembly presents many challenges. Among these challenges, the airbag should have a relatively compact and lightweight structure for easy incorporation into or replacement of a typical seatbelt system. At the same time, however, the airbag must have the strength to withstand the forces of the inflating gases and the occupant's forward motion. These criteria have stood in the way of practical and effective airbag-seatbelt systems.

SUMMARY OF THE INVENTION

It is therefore an object of the present invention to overcome the foregoing and other difficulties encountered in the prior art.

Another object of the present invention is to provide a fabric having particular qualities in terms of strength, weight, and thickness.

Another object of the present invention is to provide a fabric having greater strength in a particular direction of the fabric.

Another object of the invention is to provide an inflatable occupant restraint device that is less prone to failure due to the forces acting in one direction by contact with a vehicle's occupant and in another direction by the inflator gases.

Another object of the present invention is to provide an inflatable occupant restraint device having a size and weight suitable for incorporation into a seatbelt structure.

To achieve the objects and in accordance with the invention, as embodied and broadly described herein, the invention relates to a woven fabric formed of warp yarns and fill yarns, wherein the fill yarns have a denier at least about three times larger than the denier of the warp yarns.

The invention also relates to an inflatable airbag device having an airbag formed of a woven fabric constructed of warp yarns and fill yarns, wherein the fill yarns have a denier at least about three times larger than the denier of the warp yarns.

DETAILED DESCRIPTION OF THE INVENTION

One embodiment of the invention embraces an unbalanced twill weave fabric constructed of warp yarns, also known as yarns running in the machine direction, and fill yarns, also known as yarns running in the cross direction. The warp yarns and fill yarns have a disparate size, which may be measured in terms of denier. The yarns may have a disparate size such that the fill yarns have a denier of at least three times the denier of the warp yarns.

The invention thus carries an advantage in having fabric strength and elongation properties that vary in the warp and fill directions of the fabric. The disparate yarn sizes result in a heavier, stronger yarn being used in the fill direction. From this heavier, stronger yarn used in the fill direction, the fabric derives increased strength in the fill direction.

Figure 1:
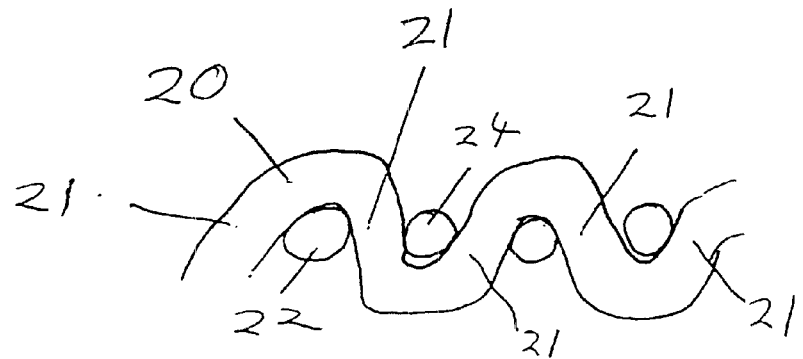
FIG. 1 shows a weave pattern of a 1×1 plain weave.
Figure 2:
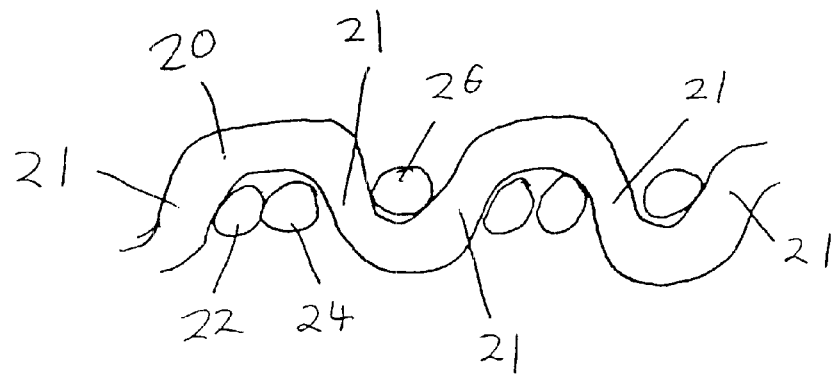
FIG. 2 shows a weave pattern of a 2×1 twill weave in accordance with the present invention.

The twill, weave may further contribute to the unbalanced properties of the fabric. As shown in FIG. 1, a plain weave having a 1×1 construction is formed by alternately passing a warp yarn 20 over a single fill yarn 22, and then under a single fill yarn 24, where the pattern further repeats itself. Accordingly, this plain weave has four crossover points, i.e. interlaces 21, for every four fill yarns across the fabric or web. An example of a twill weave pattern, however, is shown in FIG. 2. In a 2×1 twill weave fabric, warp yarn 20 alternately passes over two fill yarns 22 and 24 and then under one fill yarn 26. The 2×1 twill weave, then, has only four interlaces 21 for every six fill yarns. By having less interlaces than the plain weave, the 2×1 twill weave allows for the insertion of more filling yarns into the fabric.

Figure 3:
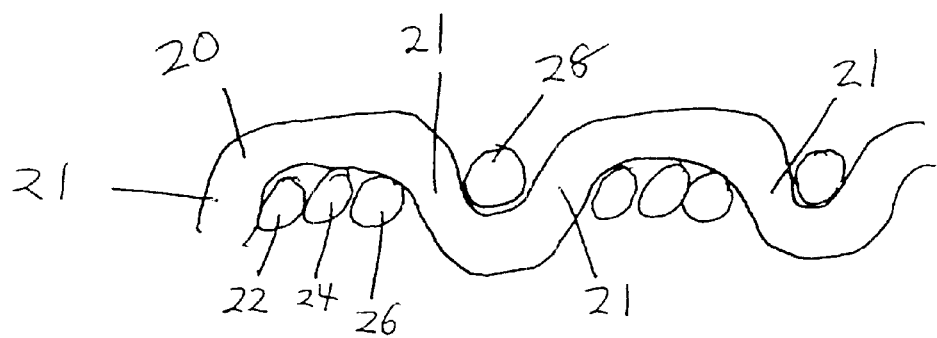
FIG. 3 shows a weave pattern of a 3×1 twill weave in accordance with the present invention.
Figure 4:
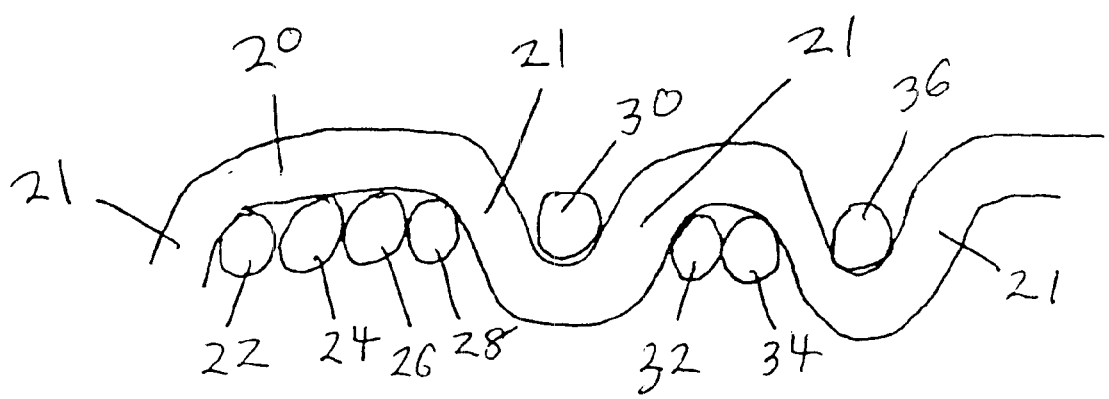
FIG. 4 shows a weave pattern of a 4×1×2×1 twill weave in accordance with the present invention.

This effect is even more exaggerated in a 3×1 twill weave as shown in FIG. 3. The 3×1 twill weave shown in FIG. 3 has a warp yarn 20 alternately passing over three fill yarns 22, 24, and 26, and then under a single fill yarn 28. The 3×1 twill weave thus has only four interlaces 21 for every eight fill yarns. Other variations of the twill weave may be used in accordance with the present invention, such as the 4×1× 2×1 twill weave shown in FIG. 4. This weave has a warp yarn 20 passing over four fill yarns 22, 24, 26, and 28, under one fill yarn 30, over two fill yarns 32 and 34, and then under a single fill yarn 36. The over-under weave pattern described for every weave, of course, continues and repeats over the length of the fabric.

Decreasing the number of interlaces per fill yarn in a twill weave thus allows for the incorporation of more fill yarns per unit length of fabric. For example, a plain weave using 45 denier nylon 6,6 warp yarns and 210 denier nylon 6,6 fill yarns, has 226 warp yarns per inch and 70 fill yarns per inch. A 2×1 twill weave using 45 denier nylon 6,6 warp yarns and 210 denier nylon 6,6 fill yarns, however, has 226 warp yarns per inch and 84 fill yarns per inch. The inclusion of more fill yarns in a unit length of fabric results in increased strength in the fabric's fill direction.

The thickness of a woven fabric depends not only on the raw yarn diameters added together, but also on the degree of "crimping" due to the interlacing of the yarns. Because twill weaves have fewer interlaces than plain weaves, there is less crimp in a twill weave. Thus, the thickness of the fabric may be more directly dependent on the thickness of the warp and fill yarns and not on the degree of crimping in the fabric. The use of fill yarns having a denier substantially larger than the denier of the warp yarns further enhances this effect. The thickness of the fabrics embraced by the invention may range from about 4 to about 12 mils.

The fabrics of the present invention therefore include twill weaves having 2×1 patterns, 3×1 patterns, and higher. A fabric having a 5×1 pattern, or higher, changes slightly and becomes what is known as a "satin" weave. The present invention also embraces such satin weaves. The weaves may also have variable patterns, such as a 4×1×2×1 twill weave. Based on this disclosure, one of ordinary skill can vary the weave patterns usable with the purpose of providing an increased number of fill yarns present in unit length of fabric.

As mentioned, the present invention also embraces the use of fill yarns having a denier at least about three times higher than the denier of the warp yarns. For example, a fabric in accordance with the present invention may have fill yarns with a denier in the range of about 70 to about 1260, and warp yarns with a denier in the range of about 30 to about 420. More preferably, the fill yarns may have a denier of about 200 to about 315, and the warp yarns may have a denier of about 45 to about 100.

A fabric of the present invention may have about 35 to about 275 warp yarns per inch, and about 20 to about 125 fill yarns per inch. Preferably, a fabric will have about 150 to about 250 warp yarns per inch, and about 50 to about 100 fill yarns per inch.

The yarns may be made of nylon, polyester, polyolefin, aromatic polyamide fibers such as Kevlar®, or amide fibers such as Nomex®, with nylon 6,6 as the preferred material. The present invention also embraces the use of one material for the warp yarns, and a different material for the fill yarns. For example, a fabric may have a combination of nylon warp yarns and polyester fill yarns, or nylon warp yarns and Kevlar fill yarns.

A preferred embodiment of the present invention embraces a fabric having nylon warp yarns and polyester fill yarns. Such a fabric may comprise, for example, 45 denier nylon 6,6 in the warp direction and 220 denier polyester in the fill direction. An advantage in such a fabric may arise because the polyester will stretch to a lesser degree than the nylon 6,6 yarns. For example, where such a fabric forms an airbag used in combination with a seatbelt made of polyester, the elongation properties of the airbag fabric will more closely match the elongation properties of the seatbelt material.

One or both sides of fabrics made in accordance with the invention may also be calendered after weaving, under conditions well known in the art. By way of example, a fabric may be hot calendered in a three roll calender at a pressure of 2600 psi with a 400° F. roll temperature.

Additionally, after the calendering step, one may also add coating materials to the twill or satin weave fabric. These coating materials may include silicone polymers, urethanes, PVC, rubber, or other film coatings. By the steps of calendering and/or coating, one may control the fabric's weight and permeability to fluids.

An unbalanced twill weave fabric of the present invention may also have a weight from about 2.0 ounces per square yard to about 10.0 ounces per square yard. In this respect, one may take advantage of the increased strength of the fabric in the fill direction by aligning an unbalanced twill weave fabric so that the yarns in the fill direction bear most of the load or forces imposed by the fabric's intended use. In this way, the increased strength properties derived from the fill yarns may allow use of fabrics having relatively lighter weights in instances formerly requiring the use of heavier fabrics.

One such use exists in the field of airbag restraint systems for vehicles. Such an airbag restraint system must have the capability to withstand several directional forces of extreme magnitude. These forces include the force produced by the occupant's motion against the airbag in the event of a collision, and the force of the inflator gases as they enter the airbag.

In the case of an airbag designed for incorporation into a seatbelt, the problems related to providing a suitable airbag fabric are compounded. First, the airbag should have a shape consistent with incorporation into the seatbelt. For this purpose, a substantially elongated or tubular shape may be effective, although other shapes are embraced by the invention. The fabric for the airbag should also be lightweight. These criteria of shape and weight may complicate the task of also providing a fabric capable of withstanding the forces produced in the event of a collision and activation of the airbag system.

Indeed, the force generated by an occupant's forward motion against a shoulder harness seatbelt containing an airbag may be as high as 4000 pounds. Comparatively, the force generated by the gases inflating the airbag may be significantly less, for example about 150 pounds per linear inch for a tubular airbag having a length of about 36 inches and a circumference of about 22 inches.

Figure 5:
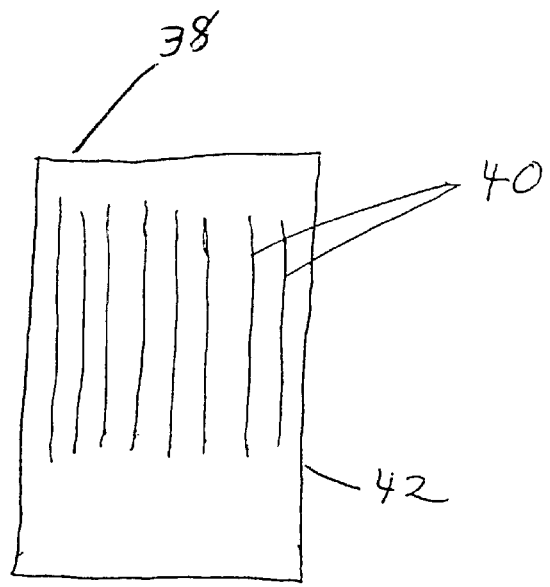
FIG. 5 shows a fabric cut in a rectangular shape in accordance with the present invention.
Figure 6:
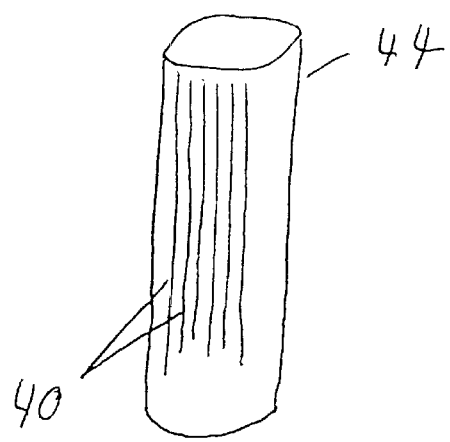
FIG. 6 shows a portion of an elongated airbag in accordance with the present invention.

A fabric of the present invention therefore provides properties tailored to withstand directional forces of such varied magnitude. An unbalanced twill weave fabric, having a fill yarn denier at least about three times greater than the warp yarn denier, and an increased number of fill yarns per inch of fabric, has a substantially increased strength in the fill direction. Accordingly, one may construct a substantially elongated or tubular airbag out of a rectangular piece of fabric 38, where the fill yarns 40 run substantially parallel to the longest dimension 42 of the rectangle as shown in FIG. 5. FIG. 6 shows a substantially tubular airbag 44 constructed from the rectangular piece, with the two long ends of the rectangle fastened together so that when the airbag is attached to a seatbelt, the fill yarns 40 will run substantially parallel to the length of the seatbelt. These ends may be fastened together by any means well known in the art to provide sufficient strength, such as by stitching, an adhesive, or bonding with heat. The top and bottom ends of the tubular airbag are sealed to form a closed structure in the same manner, with one end in fluid communication with a gas inflator means.

Orientation of the fill yarns to run substantially parallel to the longest dimension of the elongated tubular airbag and the seatbelt's shoulder harness aligns the strongest dimension of the unbalanced twill weave fabric in a direction to withstand the greatest force encountered in the event of a collision and activation of the airbag, i.e., the force generated by the occupant's forward motion against the airbag. The strength of the airbag fabric resulting from the warp yarns, although less than that provided by the fill yarns, is sufficient to withstand the force created by the inflating gases against the inside surface of the airbag fabric. This alignment of the airbag fabric, having disparate strength properties between the warp and the fill direction, allows for the use of a lightweight fabric for construction of the airbag.

The airbag may be folded in any manner to reduce its bulk for storage as part of the seatbelt apparatus. To this end, a fluted folding pattern has particular use in conjunction with the present invention.

Similarly, an airbag of the present invention may also be combined with the seatbelt system in any way, such as by attaching it to the shoulder harness or lap portion of a seatbelt. Alternatively, an airbag of the present invention may replace all or a portion of the seatbelt assembly, for example the strap of the shoulder harness or lap portion of the belt.

EXAMPLE 1

A 2×1 twill weave fabric was constructed using a warp yarn of 45/20 P-1167 DuPont Nylon and a fill yarn of 210/34 T-728 DuPont Nylon. The fabric was calendered by a three roll calendar at a temperature of 400° F. and pressure of 2600 psi at a rate of 25 yards per minute. A silicone polymer coating of about 0.5 ounces per square yard was then applied. The properties of the fabric are shown in Table 1.

COMPARATIVE EXAMPLE 1

A 2×1 twill weave fabric was constructed using P-1167 nylon warp and fill yarns, both having a denier of 140. The fabric was calendered by a three roll calender at a temperature of 400° F. and pressure of 2600 psi at a rate of 25 yards per minute to produce a fabric having the properties shown in Table 1.

COMPARATIVE EXAMPLE 2

A 2×1 twill weave fabric was constructed using T-728 nylon warp and fill yarns, both having a denier of 210. The properties of this fabric are shown in Table 1.

COMPARATIVE EXAMPLE 3

A plain weave fabric was constructed using T-728 nylon warp and fill yarns, both having a denier of 210. The properties of this fabric are shown in Table 1.

TABLE 1

| Fabric Type | Example 1 | Comparative Example 1 | Comparative Example 2 | Comparative Example 3 |
|---|---|---|---|---|
| Weave | 2 × 1 Twill | 2 × 1 Twill | 2 × 1 Twill | 1 × 1 Plain |
| Warp Denier | 45 | 140 | 210 | 210 |
| Fill Denier | 210 | 140 | 210 | 210 |
| Warp Count (yarns/inch) | 245 | 175 | 81 | 76 |
| Fill Count (yarns/inch) | 85 | 86 | 84 | 72 |
| Uncoated Weight (oz./sq. yd.) | 4.0 | 5.0 | 5.0 | 4.8 |
| Thickness (mils) | 6.8 (calendered) | 7.8 (calendered) | 10.1 (est. 8.0 calendered) | 10.0 (est. 8.0 calendered) |
| Warp Grab Tensile (lbs.) | 200 | 350 | 375 | 350 |
| Fill Grab Tensile (lbs.) | 400 | 200 | 400 | 350 |

As shown in Table 1, the unbalanced twill weave fabric of Example 1 showed superior grab tensile strength in the fill direction, despite having the smallest thickness and weight compared to each of the fabrics of Comparative Examples 1–3. One may thus advantageously align the fill direction of the fabric in a manner so that the fill direction of the fabric bears the burden of the highest loads expected for the fabric's intended use.

While this disclosure details the use of an unbalanced twill weave fabric in conjunction with combined seatbelt/airbag systems, a fabric in accordance with the present invention may have other uses as well. Fabrics of the present invention may be used for airbags not stored in combination with a seatbelt, portable load bearing fabrics such as those used to transport injured animals or people, or any other use where the fill yarns may be oriented to withstand an increased magnitude of force in a specific direction.

What is claimed is:

1. A woven fabric for an inflatable restraint device formed of warp yarns and fill yarns, wherein the fill yarns have a denier of four to about 40 times larger than the denier of the warp yarns, wherein each warp yarn running in a machine direction in said fabric passes in a repeating pattern over two to six fill yarns before passing under fill yarn and wherein the ratio of the strength of the fabric in the fill direction to the strength of the fabric in the warp direction is a about 2:1.

2. The woven fabric of claim 1, having a 2×1 twill weave pattern.

3. The woven fabric of claim 1, having a 3×1 twill weave pattern.

4. The woven fabric of claim 1, having a 4×1 twill weave pattern.

5. The woven fabric of claim 1, having a satin weave pattern.

6. The woven fabric of claim 1, wherein the warp and fill yarns are selected from the group consisting of nylon yarns, polyester yarns, polyolefin yarns, aromatic polyamide yarns, aramide yarns, and combinations thereof.

7. The woven fabric of claim 1, where the warp yarn is 45 denier nylon 6,6 and the fill yarn is 210 denier nylon 6,6.

8. The woven fabric of claim 1, where the warp yarn is 45 denier nylon 6,6 and the fill yarn is 220 denier polyester.

9. The woven fabric of claim 1, wherein the fabric has been hot calendered.

10. The woven fabric of claim 1, having an elastomeric coating or film on its surface.

* * * * *

UNITED STATES PATENT AND TRADEMARK OFFICE
CERTIFICATE OF CORRECTION

PATENT NO. : 6,632,754 B1
DATED : October 14, 2003
INVENTOR(S) : Otis Bryce Rose, III; Ronald J. Small and Wilford Allen Leonard, Jr.

It is certified that error appears in the above-identified patent and that said Letters Patent is hereby corrected as shown below:

Column 6,
Line 38, all three occurrences of "yams" should read -- yarns --.
Line 40, "yams," should read -- yarns, --.
Line 40, "yam" should read -- yarn --.
Line 42, "yams" should read -- yarns --.
Line 42, "under fill yarn and" should read -- under a fill yarn, and --.

Signed and Sealed this

Twenty-fifth Day of November, 2003

JAMES E. ROGAN
*Director of the United States Patent and Trademark Office*